United States Patent Office 2,804,483
Patented Aug. 27, 1957

2,804,483

PRODUCTION OF α,α,α,2,3,4-HEXACHLORO-TOLUENE

Hyman M. Molotsky, Chicago, Ill., assignor to Velsicol Chemical Corporation, a corporation of Illinois No Drawing. Application January 12, 1954,
Serial No. 403,657

1 Claim. (Cl. 260—651)

This invention relates to a new composition of matter and to a novel method for its production. More specifically, the present invention relates to the production of a new halogenated derivative of toluene containing six chlorine atoms in fixed positions.

The process of the present invention comprises a rearrangement induced by heating at elevated temperatures of 1,2,3,4,7,7-hexachlorobicyclo-[2.2.1]-2,5-heptadiene. This heating causes a rearrangement of the starting material to α,α,α,2,3,4-hexachlorotoluene having the following structure:

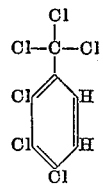

The product of the present invention shown above is useful as a chemical in its own right, as an insecticide, or as an intermediate in the production of other valuable chemical compounds.

For example α,α,α,2,3,4-hexachlorotoluene may be used as a sulfurless vulcanizing agent for GRS (butadiene-styrene copolymer) type rubber. It may also be used as an accelerator for the vulcanization of GRS rubber in conjunction with sulfur or sulfur derived curing agents. As a chemical intermediate the present composition has properties which render it especially useful to the chemical industry. The trichloromethyl group may be readily hydrolyzed to form a carboxylic acid group. This is accomplished by heating the compound of the present invention in a strong mineral acid such as sulfuric. The 2,3,4-trichlorobenzoic acid produced by such hydrolysis has utility as a food preservative, fungistat, local anesthetic, dye stuff intermediate, and medicinal.

The starting material 1,2,3,4,7,7-hexachlorobicyclo-[2.2.1]-2,5-heptadiene may be prepared by reacting vinyl chloride and hexachlorocyclopentadiene. The 1,2,3,4,5,7,7-heptachlorobicyclo-[2.2.1]-2-heptene adduct thus formed is dehydrohalogenated by treatment with alcoholic KOH to produce the 1,2,3,4,7,7-hexachlorobicyclo-[2.2.1]-2,5-heptadiene.

The process of the present invention as previously indicated comprises the heat activated rearrangement of the aforesaid halogenated bicyclic diolefin. While the rearrangement proceeds at 160° C. and above at atmospheric pressure, it is preferred to carry out the reaction at a temperature of at least about 190° C., since yields of substantially 100% are obtainable practically instantaneously at such temperatures, under atmospheric conditions of pressure.

The time necessary to effect the complete conversion varies in an inverse manner with the temperature utilized. Thus at 160° C. only 25% conversion is realized in about eight hours, whereas the conversion is complete in about eight hours at 180° C. At about 195° C. and above the rearrangement is almost instantaneous in 100% yield. Generally at temperatures above 190° C. the reaction time is about one-half minute to five minutes. Higher reaction temperatures may be employed up to the decomposition temperature of the product, but such higher temperatures are unnecessary since they provide no benefits. For example, the reaction was carried out at temperatures as high as 295° C., without decomposition of the product, but with no benefit to the yield or to the rate of the reaction.

The present process may be effected in the presence of solvent, but a preferred procedure is to run the reaction in the absence of solvent to facilitate recovery of the product without fractional distillation. High boiling solvents which may be used if desired are exemplified by m-chlorotoluene, m-butyl toluene, o-ethyl toluene, silicone oils, and the like.

Pressure does not appear to be a critical factor in the present invention and it is preferred that the reaction be run in ordinary apparatus at atmospheric pressure. If desired, the reaction may be run at pressures either above or below atmospheric pressure without changing the character or yield of the process.

The following examples will illustrate the process of the present invention:

EXAMPLE 1

*Reaction at 160° C.*

Hexachlorobicycloheptadiene was placed in a round-bottomed flask equipped with a reflux condenser, stirrer, and thermometer. The contents of the vessel were heated to about 160° C. and maintained at 160±3° C. for seven hours. The total yield of α,α,α,2,3,4-hexachlorotoluene was 24%. The rate of conversion at 160° C. was about 3% per hour.

EXAMPLE 2

*Reaction at 180° C.*

Hexachlorobicyclopheptadiene was placed in a round-bottomed flask equipped with a reflux condenser, stirrer, and thermometer. The contents of the flask were heated to a temperature of about 175–180° C. and maintained at 175–185° C. for seven hours. The average conversion rate was about 12% per hour, and the yield was 87%.

EXAMPLE 3

*Reaction at 195° C. and above*

Hexachlorobicycloheptadiene was placed in a round-bottomed flask equipped with a reflux condenser, stirrer, and thermometer. The contents of the flask were heated to about 190° C. where slight bubbling was noticed. At about this time the temperature rose exothermically to about 195° C. and the bubbling increased rapidly. At 195° C. the temperature rose rapidly to 260° C. and the contents of the flask frothed considerably. The temperature remained at 260° C. for several minutes and began to subside. The contents of the vessel were allowed to cool. The yield of α,α,α,2,3,4-hexachlorotoluene was 100%. The total reaction time above about 190° C. was about four minutes.

The product α,α,α,2,3,4-hexachlorotoluene has an infrared spectrum quite dissimilar from the starting material. The product has a boiling point of 120–120.5° C. at 0.13 mm. of mercury pressure, a density of about 1.70 at 25° C., and a refractive index of $n_D^{20}$ 1.6109.

I claim:

A method for producing α,α,α,2,3,4-hexachlorotoluene which comprises heating 1,2,3,4,7,7-hexachlorobicyclo-

[2.2.1]-2,5-heptadiene at a temperature between about 190° C. and about 295° C.

References Cited in the file of this patent

UNITED STATES PATENTS 2,676,132    Bluestone _____ Apr. 20, 1954

FOREIGN PATENTS 498,176    Belgium _____ Oct. 14, 1950

OTHER REFERENCES

Huntress: "Organic Chlorine Compounds," pages 927, 1296 (1948).